United States Patent [19]
Gardner et al.

[11] Patent Number: 5,446,710
[45] Date of Patent: Aug. 29, 1995

[54] FOCUS ERROR DETECTION USING AN EQUAL PATH LENGTH LATERAL SHEARING INTERFEROMETER

[75] Inventors: Timothy S. Gardner; Ronald P. Stahl, both of Tucson, Ariz.; Syed T. Shafaat, Langley, Wash.

[73] Assignee: International Business Machines Corporation, Armonk, N.Y.

[21] Appl. No.: 972,578

[22] Filed: Nov. 6, 1992

[51] Int. Cl.$^6$ .............................................. G11B 7/00
[52] U.S. Cl. ..................... 369/44.14; 369/112; 359/638
[58] Field of Search ............. 369/112, 110, 44.14, 369/44.23, 44.24, 44.41, 44.37, 118, 13; 250/201.5; 359/831, 832, 834, 836, 629, 633, 638, 639, 640, 739; 356/345, 348, 349, 352, 359, 360

[56] References Cited

U.S. PATENT DOCUMENTS

| | | | |
|---|---|---|---|
| 3,905,703 | 9/1975 | Matsumoto | 369/44.24 |
| 4,604,739 | 8/1986 | Cohen | 369/44.11 X |
| 4,712,205 | 12/1987 | Smid et al. | 369/44.44 X |
| 4,724,533 | 2/1988 | Ohara et al. | 369/44.42 |
| 4,870,632 | 9/1989 | Shiono et al. | 369/44.23 |
| 4,873,678 | 10/1989 | Nakamura et al. | 369/44.14 |
| 5,016,234 | 5/1991 | Nakamura et al. | 369/44.14 |

FOREIGN PATENT DOCUMENTS

| | | | |
|---|---|---|---|
| 0203649 | 10/1983 | Denmark | 359/638 |
| 1352363 | 3/1964 | France | 359/638 |
| 0222702 | 11/1985 | Japan | 356/360 |

OTHER PUBLICATIONS

Cohen (1987) "Lateral Shearing Interferometer (LSI)" Analysis of Methods For Detecting Focus Error in Optical Data Storage Systems pp. 153–185 (Graduate College-Univ. of Ariz.).
Murty (1978) "Lateral Shearing Interferometers" Optical Shop Testing (Wiley Series in Pure and Applied Optics) pp. 105–148.
Kelsall (1959) "Optical Frequency Response Characteristics in the presence of Spherical Aberration measured by an automatically recording Interferometric Instrument" Proc. Phys. Soc. LXXXIII, 3:465–479.
Saunders (1967) "A Simple, Inexpensive Wavefront Shearing Interferometer" Applied Optics 6(9):1581–1583.
Wyant and Smith (1975) "Interferometer for measuring power distribution of ophthalmic lenses" Applied Optics 14(7):1607–1612.

Primary Examiner—Aristotelis Psitos
Assistant Examiner—Thang V. Tran
Attorney, Agent, or Firm—Greenlee & Winner

[57] ABSTRACT

This invention provides an equal path length lateral shearing interferometer and its implementation in focus detection devices, particularly for optical data storage devices. The interferometer comprises a beamsplitter and two abutting roof prisms. Shifting the placement of a roof prism along an axis orthogonal to the direction of light propagation and to the peak of the roof creates a lateral shear between the two output beams. Rotation a roof prism about this axis produces a tilt between the two output beams. This creates an interference pattern with a rotational orientation which is a function of the focus of the beam impinging on the optical storage medium. A pattern sensor is provided to adjust the focus of the beam in an accurate and dynamic manner.

7 Claims, 3 Drawing Sheets

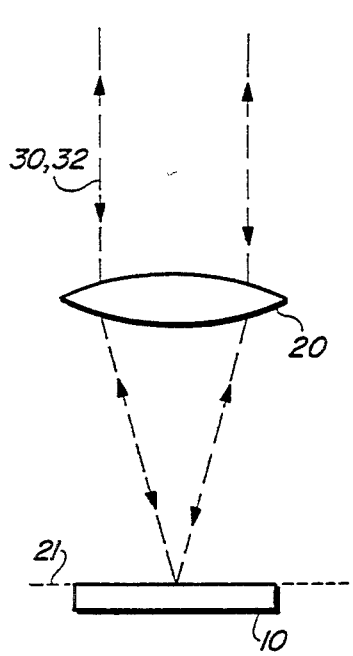
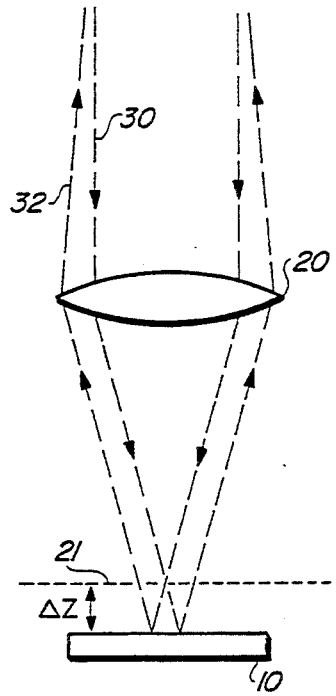
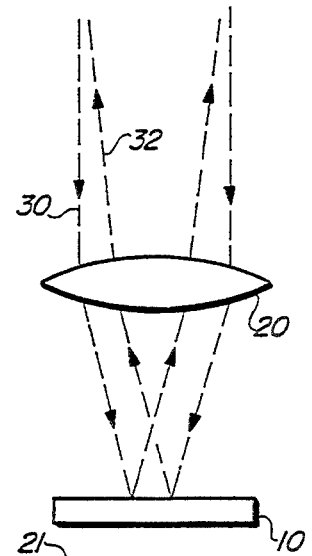
FIG. 3A    FIG. 3B    FIG. 3C
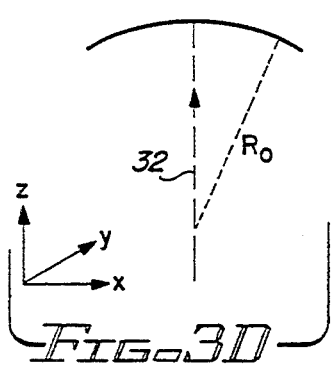
FIG. 3D
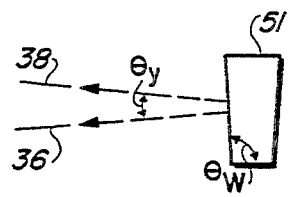
FIG. 4B
PRIOR ART
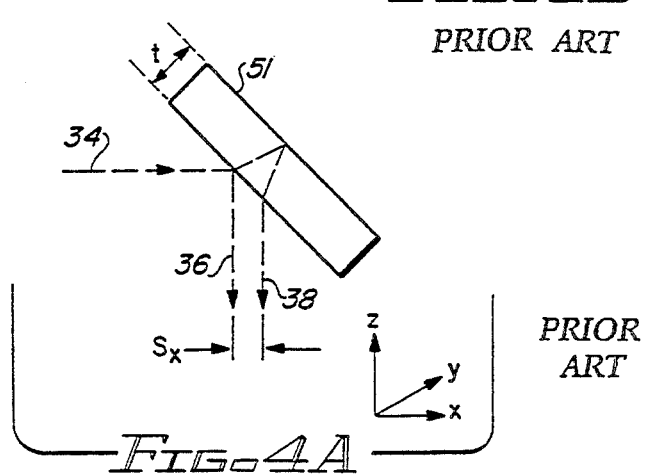
FIG. 4A
PRIOR ART

FOCUS ERROR DETECTION USING AN EQUAL PATH LENGTH LATERAL SHEARING INTERFEROMETER

FIELD OF THE INVENTION

This invention pertains to equal path length lateral shearing interferometers and to their use in aberration detection, in focus detection and in optical data storage devices.

BACKGROUND OF THE INVENTION

In recording or sensing data on an optical storage disk, accurate focus of the impinging light beam is critical. A real time servo system is needed to keep the optics in focus. A laser supplies a collimated monochromatic light beam which is focused by a lens system onto a rotating optical disk. The disk reflects the beam through a lens system to a beamsplitter which directs a portion of this beam to a focus detection system. A focus error signal is generated and electronically coupled to the focussing lens system. Most focus detection techniques rely on the following properties of the returning beam. If the disk is at the focal plane of the focussing lens system and the light source is collimated, the return beam will also be collimated. If the disk is too close to the lens system the return beam will be more divergent and if it is too far the return beam will be more convergent.

The astigmatic focus scheme is representative of the conventional focus detection technology. A cylindrical lens provides different focal lengths for the horizontal and vertical axes of the return light beam. A quadrant detector placed at the average of the focal lengths senses a round pattern when the beam is in focus and vertically or horizontally elliptical patterns when the focus is too-close or too-far. A disadvantage of this method is the difficulty in aligning the cylindrical lens and quadrant detector along the light propagation axis and the two orthogonal axes, and in aligning the angular orientation of the detector about the light propagation axis. Further, this method is sensitive to environmental influences such as mechanical shock and temperature variations. Thermal shifts in the refractive index of optical components and in the optical path length change the focus of the astigmatic lens on the detector and thus degrade the focus detection accuracy.

Numerous focus detection schemes have been proposed which are less sensitive to thermal shifts (see, for example, Ohara et al. in U.S. Pat. No. 4,724,533 and Smid et al. in U.S. Pat. No. 4,712,205). However, they typically function by focussing one or more beams onto a plurality of detectors and thus have the critical alignment requirements of the astigmatic system. D. K. Cohen (U.S. Pat. No. 4,604,739 and Ph.D. Thesis, Univ. of Arizona, 1987) disclosed a method of focus detection employing rotated interference patterns. The technique relies on the properties of lateral shearing interferometers (Malacara in *Optical Shop Testing*, John Wiley & Sons, New York, 1978, pp. 105–148). If a collimated beam of light impinges on a lateral shearing interferometer (LSI) an interference pattern is produced. If the beam is rendered diverging, as when the optical disk is too close to the focus, the interference pattern rotates in one direction and if the beam is converging the interference pattern rotates in the opposite direction. A quadrant detector placed in the interference pattern detects the rotational orientation of the interference fringes.

With the LSI of Cohen's invention, the interference pattern does not change with propagation so the quadrant detector can be placed at any distance from the interferometer. This provides design flexibility and permits a compact detection device. In the directions orthogonal to the light propagation axis the quadrant detector must be centered on an interference fringe, a far less stringent requirement than placement at the focal point of a lens. In addition, this technique reduces sensitivity to the exact optical path lengths and thus to temperature variations.

Cohen's patent does not address a critical aspect of the lateral shearing interferometer used in this application. Diode lasers are, in general, the light source of preference in optical storage systems. Typically, they have short coherence lengths of less than 1 mm. Consequently no fringes will be visible at the quadrant detector when the path length difference between the beams that form the interference pattern exceeds this coherence length. It is therefore an object of the present invention to solve this important implementation issue with the introduction of a compact equal path length lateral shearing interferometer.

SUMMARY OF THE INVENTION

The present invention is an equal path length lateral shearing interferometer and its implementation in focus detection devices, particularly for optical data storage systems. This invention provides a particular advantage over the prior art when the coherence length of the light source is short, as is the case with semiconductor diode lasers.

The lateral shearing interferometer of the present invention comprises a beamsplitter and two abutting roof prisms. The beamsplitter divides the input beam into two portions and directs a portion to each of the prisms. The prisms return the two beams to the beamsplitter, which recombines them at the output. These optical elements can be arranged to provide equal path lengths for the two light beams. Shifting the placement of a roof prism along an axis orthogonal to the direction of light propagation and to the peak of the roof creates a lateral shear between the two beams. Rotating a roof prism about this axis produces a tilt between the two beams at the output.

The interferometer of the present invention is a compact unit wherein the beamsplitter is a beamsplitting cube and the two roof prisms abut the cube on adjacent faces. To provide a tilt between the two beams, an abutting surface of the beamsplitter can be ground at an angle. Alternatively, the hypotenuse face of the roof prism can be ground to provide a tilt. For commercial applications this compact interferometer has advantages over the separately mounted and aligned components of the interferometers of the prior art.

For focus error detection, an embodiment of this invention includes a collimated monochromatic coherent light source and a lens system to focus the beam onto a reflective target surface. The reflected beam is recollimated, typically by the same lens system, and a portion is directed to the lateral shearing interferometer. The collimation error of the return beam is a function of the focus error of the impinging beam, and the rotational orientation of the fringes generated by the interferometer is a function of the return beam collimation. A quadrant detector of four photocells is placed in the interference pattern to measure the rotational orientation and thereby measure focus error.

In a specific form of this invention the focus detection device is employed in an optical data storage system. In this system the focus target is an optical record medium with addressable data storage locations. Electronic circuits are connected to the quadrant detector to analyze the interference pattern and to adjust the focus of the beam impinging on the optical record medium in an accurate and dynamic manner, and thereby reduce the focus error.

BRIEF DESCRIPTION OF THE DRAWINGS

FIG. 3 shows the focus of a beam impinging on a reflective surface and the correlation with the collimation of the reflected beam for in focus (FIG. 3A), disk too-far (FIG. 3B), disk too-close (FIG. 3C), and the curved wave front of a decollimated beam (FIG. 3D).

FIG. 4 shows the lateral shearing interferometer of the prior art in side view (FIG. 4A) and end view (FIG. 4B).

DETAILED DESCRIPTION OF THE INVENTION

Figure 1:
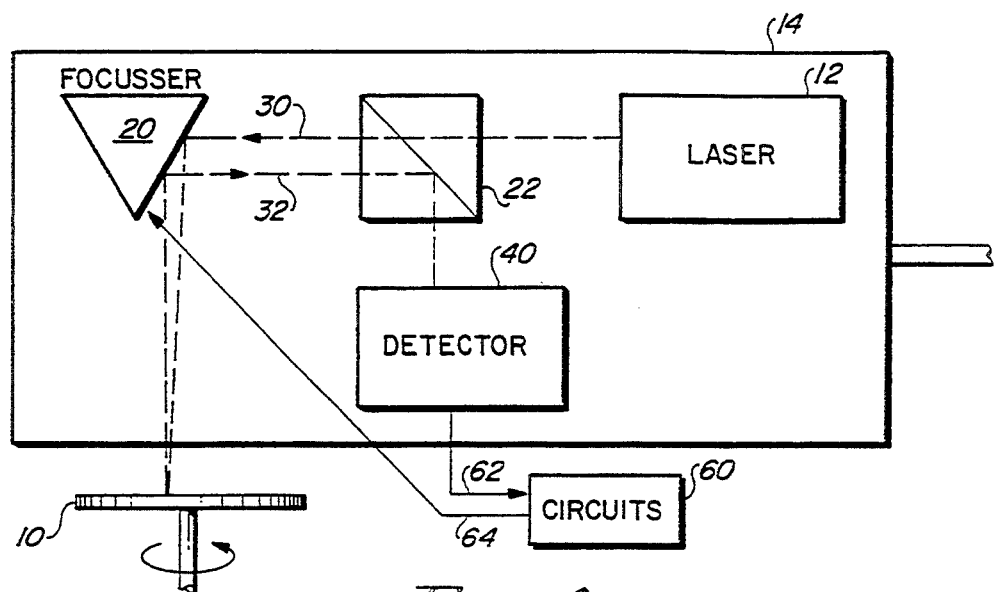
FIG. 1 is an optical data storage device including an equal path length focus error detection device.

FIG. 1 is the optical data storage device of the present invention with an equal path length lateral shearing interferometer focus error detection scheme. Monochromatic coherent light is generated by laser 12. Beamsplitter 22 transmits the generated beam 30 to focusser 20 which focusses it onto optical record storage medium 10. The reflected beam 32 is recollimated by the focusser and directed by beamsplitter 22 to focus detector 40. The focus detector converts optical indications of focus to electrical signals 62 which are analyzed by circuits 60 and the focus is corrected via focus control signals 64. In the embodiment illustrated optical components, including the focus detector, are mounted on moveable arm 14. Alternatively, these elements can be stationary (the Fixed Optical Elements configuration) and radial motion of beam 30 can be provided by movement of focusser 20.

Figure 2:
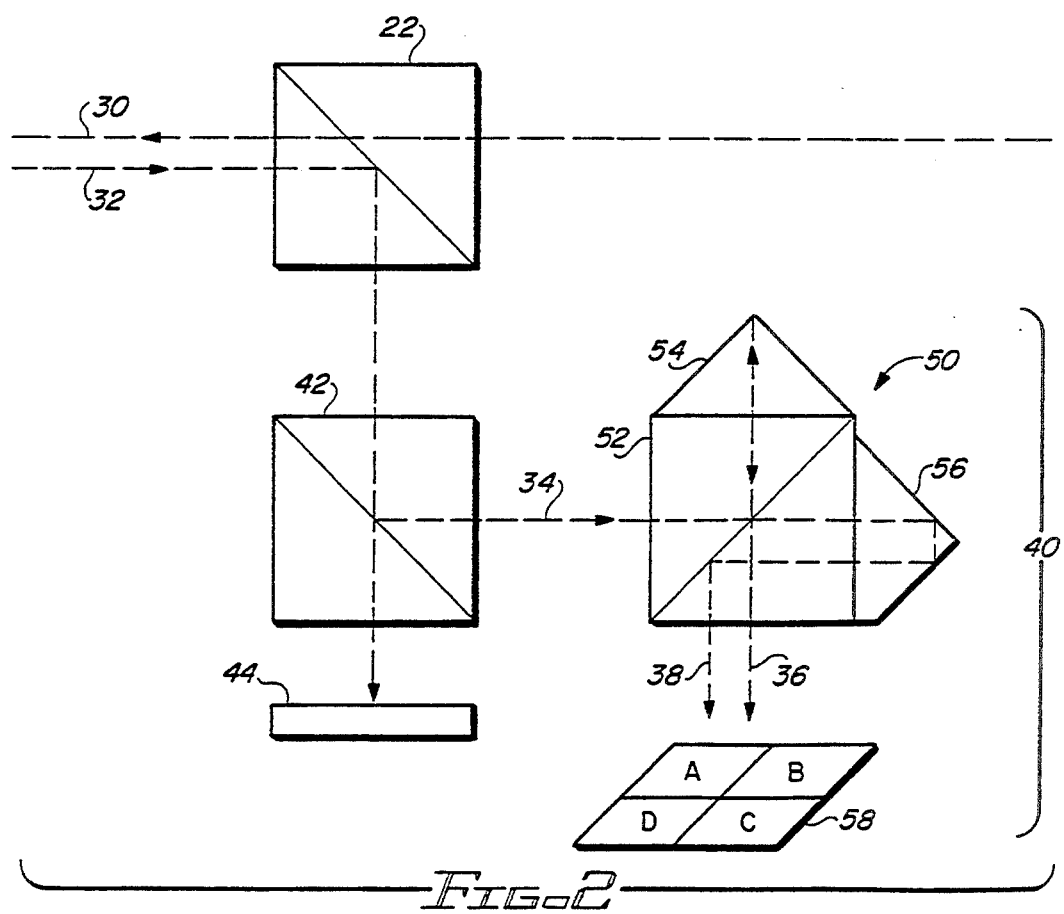
FIG. 2 is an equal path length focus error detection device.

Semiconductor diode lasers are the presently preferred light source because they can be amplitude modulated, and are reliable, low cost and compact. However, they produce a beam with a short coherence length of typically 1 mm. Laser 12 can be a semiconductor laser and it can include optical elements to collimate the beam and to create a round cross section. The components of beamsplitter 22 depend on the type of optical record medium. For example, for magneto-optical media used in erasable systems, in which the data signal is contained in polarization changes, it can be a partially polarizing beamsplitter. In other storage systems such as read-only disks and amorphous-crystalline phase-change erasable disks, in which the data are retrieved by either intensity contrasts or phase shifts, 22 can be a polarizing beamsplitter and a quarter-wave retarder. The focus detector of the present invention can be used with any of these systems. Focusser 20 focusses the beam into a preferably diffraction-limited spot. The data density depends on this spot size and, to achieve maximum storage density, active control of the focus is needed. Focusser 20 can contain a tracking mirror and a focusing objective lens or other elements such as prisms and focussing mirrors. Optical record member 10 is shown here as a rotating disk. It contains record tracks which can be concentric tracks or a single spiral track. Radial scanning of the tracks is achieved by reciprocating motion of arm 14 radially of rotating disk 10, or by motion of focusser An embodiment of the focus detector is shown in FIG. 2. Beamsplitter 22 optically couples return beam 32 with detector elements 40. Most of the light is transmitted through beamsplitter 42 to data and radial tracking detector 44. Some of the light is deflected in beam 34 to equal path length lateral shearing interferometer 50. The interferometer comprises beamsplitter 52 and roof prisms 54 and 56. Input beam 34 is divided by LSI 50 into beams 36 and 38, which interfere to produce a fringe pattern indicative of the focus on disk 10. This pattern is detected by pattern sensor 58 which, in this embodiment, is a rectangular array containing photodetectors A, B, C and D. It is drawn skewed to indicate that it is in a plane orthogonal to the plane of the paper.

In the focus error detection device of the present invention, errors in focus are manifested in collimation changes of reflected beam 32, as shown in FIG. 3. Focusser 20 is shown as a focussing objective lens with focus in plane 21. When disk 10 is in focus, collimated source beam 30 is reflected to form collimated return beam 32 (FIG. 3A). When the disk is too-far from the focus (FIG. 3B) the return beam is converging and when the disk is too-close (FIG. 3C) the return beam is diverging. The distance of the disk from the focal plane is $\Delta z$. A decollimated beam has a curved wavefront (FIG. 3D) characterized by $R_o$, the radius of curvature, which is positive for a diverging beam and negative for a converging beam.

A lateral shearing interferometer produces an interference fringe pattern in which either the spacing or rotational orientation of the fringes is a function of $R_o$. The LSI of the prior art is shown in side view (FIG. 4A) and end view (FIG. 4B). Shearing plate 51 is a wedged plate of thickness t and wedge angle $\Theta_w$, operated in this embodiment with input beam 34 at a 45° angle of incidence. The input beam is divided into beams 36 and 38 which are recombined to form an interference pattern. Output beams 36 and 38 are laterally sheared by $S_x$, which is a function of the angle of incidence, t, the thickness and the refractive index of the shearing plate. They are tilted by $\Theta_y$, which is a function of $\Theta_w$. In order to obtain interference fringes, the difference in the path lengths of beams 36 and 38 must be smaller than the coherence length of the laser. For optical glass with refractive index n=1.5 and minimum plate thickness $t \approx 2$ mm, the path length difference is about·5 mm. This exceeds the typical 1 mm coherence length of the diode lasers employed in optical data storage devices. Thus the lateral shearing interferometer of the prior art can not be used for focus detection in these devices.

The present invention provides a compact equal path length lateral shearing interferometer 50 (FIG. 5) which overcomes this implementation limitation. It comprises beamsplitter 52 and roof prisms 54 and 56. Element 52 is a means for dividing the amplitude of beam 34 and comprises two prisms which form a beamsplitting cube. Elements 54 and 56 can be the standard roof, or Porro, prisms known in the art, which have a triangular cross section with angles of 45°, 45°, and 90°. This is the geometry illustrated in this embodiment but other angles can be employed. The roof prisms can be made of optical glass and can have reflective coatings on the surfaces which do not face beamsplitter 52. In the embodiment of FIG. 5 the prism edges are parallel to the beamsplitter edges. Each prism can also be rotated about an axis normal to the hypotenuse face.

Figure 5A:
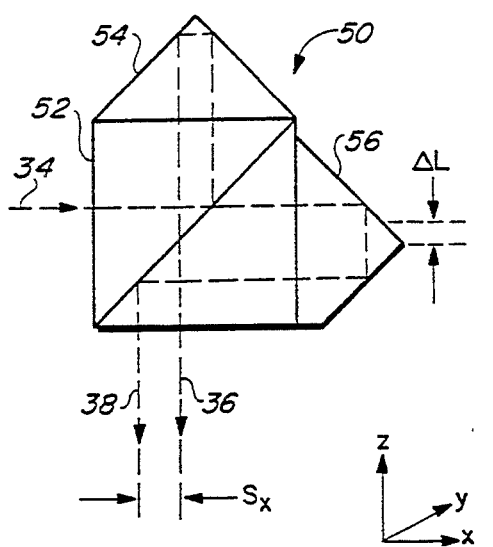
FIG. 5 shows an equal path length lateral shearing interferometer in side view (FIG. 5A) and view from right side of FIG. 5A (FIG. 5B).

To achieve a lateral shearing of beams 36 and 38 one of the roof prisms is shifted by $\Delta L$ from the beamsplitter center, as shown in FIG. 5A. This shears the output beams by $S_x = 2\Delta L$. The shear of the output beams is a pure lateral shift, i.e. there exists a plane (the plane of the paper in FIG. 5A) in which the projections of beams 36 and 38 are parallel and non-coincident lines.

Figure 5B:
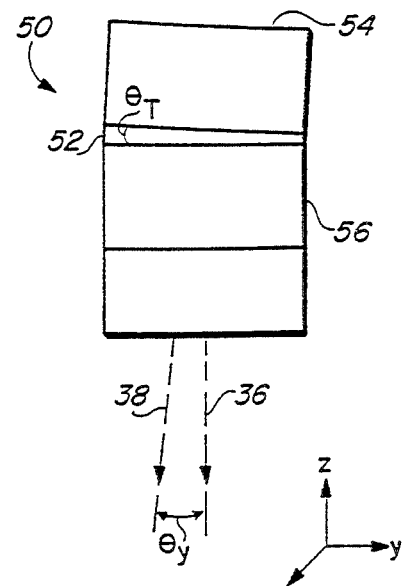

The interferometer of the present invention further provides a means for tilting the output beams so that the projections of output beams 36 and 38 in a plane orthogonal to the direction of shear are not parallel. To achieve this, one of the roof prisms is tilted by $\Theta_T$, as shown in FIG. 5B, which is a view from the right side of FIG. 5A. This tilts the beams by $\Theta_y = 2\Theta_T$. The tilt can be achieved by grinding a face of the beamsplitter which abuts a roof prism.

In the embodiment of the interferometer with a shear but no tilt, the path lengths are in theory exactly equal, and in practice are negligibly affected by the manufacturing capabilities for optical components. In the embodiment with both shear and tilt, the path length difference is a function of the beamsplitter dimensions and of $\Theta_T$. In the embodiments preferred for focus detection, this difference is orders of magnitude less than the 1 mm laser coherence length. Thus the equal path length lateral shearing interferometer of the present invention enables the implementation of the LSI in focus detection for optical storage devices.

Figure 6A:
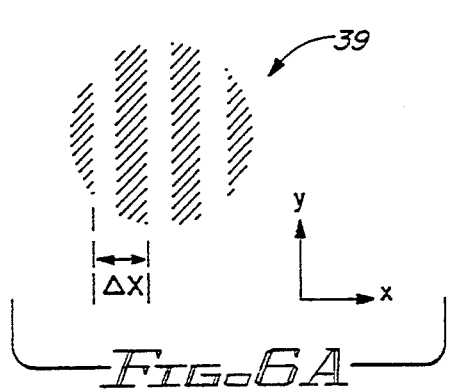
FIG. 6 is the interference pattern produced by a lateral shearing interferometer without a tilt angle (FIG. 6A), and by a lateral shearing interferometer with a tilt angle when the disk is in focus (FIG. 6B), too-far (FIG. 6C), and too-close (FIG. D).

The spacing and slope of the interference fringes are a function of $R_o$, $S_x$, and $\Theta_y$. When no tilt is introduced, the equation of a fringe is:

$$x = \frac{R_o n \lambda}{S_x} \quad \text{Eq. 1}$$

where n is an integer and $\lambda$ is the laser wavelength. FIG. 6A shows this interference pattern 39, which has fringes of fixed orientation, along the y axis, with a spacing $\Delta x$ which increases with the amount of defocus. However, the fringe spacing is independent of the sign of $R_o$ so this device can not distinguish between too-close and too-far nonfocus conditions.

With the addition of a tilt in a direction orthogonal to the shear, the equation of a fringe is:

$$y = \frac{S_x}{R_o \tan\Theta_y} x - \frac{n\lambda}{\tan\Theta_y} \quad \text{Eq. 2}$$

Figure 6C:
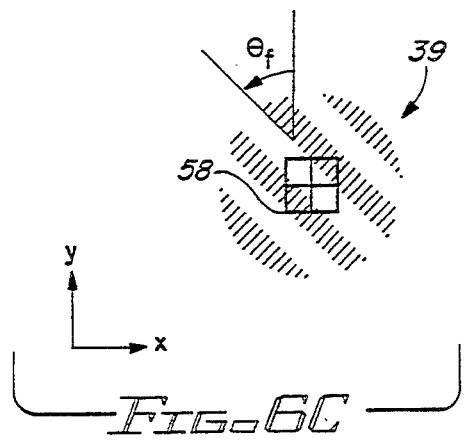
Figure 6B:
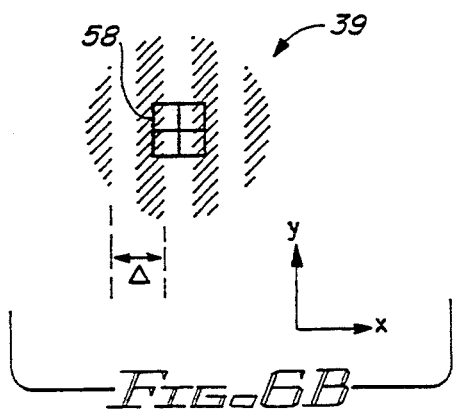
Figure 6D:
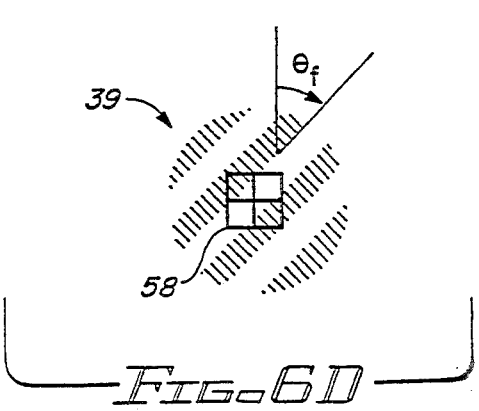

Note that Eq. 2 reduces to Eq. 1 when $\Theta_y = 0$. FIGS. 6B–D show that in this interference pattern the fringes are lines with fixed spacing $\Delta$ and with a slope that is a function of the defocus. Since the sign of $R_o$ determines the sign of the slope in Eq. 2 and therefore the rotational orientation of the fringes, $\Theta_f$, an appropriate focus error signal can be generated.

Quadrant detector 58 is placed in the fringe pattern as shown in FIGS. 6B–D. Quadrants A through D are located as shown in FIG. 2. Because the fringe pattern is not a function of distance from the interferometer, the detector can be spaced at any distance, in contrast to prior art such as the astigmatic focus method in which the placement of the detector along the light propagation axis is critical. The tilt angle $\Theta_y$ between the output beams does, in fact, introduce a distance dependence to the shear. However, for focus detection this angle is so small that no difference is detected in the interference pattern viewed at 0, 1, and 100 mm from the interferometer. The signals generated in quadrants A and C of the detector are added, as are the signals from quadrants B and D. The focus error signal is generated from the difference $(A+C)-(B+D)$. The detector is positioned to yield a zero error signal when the disk is in focus (FIG. 6B). In the embodiment shown, when the disk is too far from the lens, more light will fall on detectors A and C and thus generate a positive error signal (FIG. 6C). When the disk is too close, the error signal will become negative (FIG. 6D).

The fringe spacing and tilt can be tailored to a particular application. To illustrate the method, the optimization of the interferometer with both shear and tilt is demonstrated for an optical storage device. Following the analysis of Cohen (Ph.D. Thesis), the fringe separation $\Delta$ is:

$$\Delta = \frac{\lambda}{\sin\Theta_y} \quad \text{Eq. 3}$$

For a typical optical data storage system the beam diameter is about 4 mm. For maximum signal intensity, the quadrant detector is the same size as the beam. So that only one fringe strikes the detector, the optimum fringe spacing is about 5 mm. For a diode laser wavelength of about 800 nm, this corresponds to $\Theta_y = 0.01°$ and thus the optimum tilt of the interferometer is $\Theta_t = 0.005°$.

The sensitivity of the detector to the degree of defocussing can be tailored through the amount of shear. The maximum error signal corresponds to a fringe rotation of 45°. From Eq. 2, this occurs when:

$$\frac{S_x}{R_o \tan\Theta_y} = 1. \quad \text{Eq. 4}$$

Rewriting $R_o$ as a function of the distance $\Delta z$ of the disk from focus, the focal length $f_o$ of the objective lens, and the separation $z_I$ of the objective lens and the interferometer, Eq. 4 becomes:

$$\frac{S_x}{\tan\Theta_y} \frac{1}{(f_o^2/2\Delta z) + f_o - z_I} = 1. \quad \text{Eq. 5}$$

For a "lock on" range of $\Delta z_{max} = 5$ μm for the focus, and typical optical storage device dimensions, Eq. 5 gives $S_x = 0.3$ mm and therefore the optimum roof prism shift is $\Delta L = 0.15$ mm.

The versatility of the interferometer of this invention is evident in the ability to tailor the spacing of the interference fringes and their sensitivity to beam collimation to a particular application. This is accomplished simply by changing the roof prism shift and tilt, as taught by Eqs. 3 and 5. The LSI of this invention provides independent control of these parameters. In the embodiment of FIG. 5 the shift and tilt are shown on separate roof prisms for clarity of illustration. The shift and the tilt can be on either of the roof prisms and both can be on the same one. If one roof prism is translatable, the amount of shear can be varied. The interferometer of this invention is a unitary structure with the roof prisms abutting the beamsplitter. In fact, for the use in a focus detector, as shown in FIG. 2, beamsplitter 22, beamsplitter 42, interferometer 50, and detectors 44 and 58 can be made a compact unitary structure by abutting the elements on facing surfaces, as is clear from the drawing.

One of the roof prisms can be replaced by a flat reflective surface, which can be a reflective coating on the appropriate beamsplitting cube face. In this embodiment the single roof prism can provide both shear and tilt. Because a roof prism reflects a beam about the axis of the roof line to produce a linearly inverted image, when there is one flat mirror and one roof prism the interference pattern is formed between a beam and linearly inverted image of the beam. If the beam is symmetric about the roof line of the prism, the interference pattern is the same as with two roof prisms. If the beam is not symmetric, this is indicated by distortion of the interference pattern.

The present invention, the compact equal path length lateral shearing interferometer and its application to focus detection and to optical data storage devices, is not limited to the foregoing descriptions of configurations and applications. Adaptations of the design and applications to other systems will be readily apparent to those skilled in the art.

We claim:

1. An optical data storage device comprising an optical record storage medium with addressable data storage locations, said optical record storage medium capable of reflecting light wherein the reflected light beam has a collimation indicative of the focus of an impinging light beam, and further comprising:
   means for generating a monochromatic coherent light beam; optical path means for coupling said light beam from said generating means to said optical record storage medium;
   addressing means included with said optical path means for moving said light beam to optically access said data storage locations for recording data onto or sensing data from said optical record storage medium; and
   focus error detection means for detecting the focus error of said impinging light beam at said addressable data storage location, said focus error detection means including:
      an equal path length interference pattern generating means optically coupled with said reflected light beam, for creating an interference pattern with a dynamically varying rotational orientation indicative of the focus of said impinging light beam wherein a first rotational orientation indicates said impinging light beam being in focus at said addressable data storage location and relative clockwise or counter-clockwise rotational orientations indicate too-close or too-far nonfocus conditions; and
      rotation sensing means in optical communication with said interference pattern generating means, for sensing said rotational orientation;
   wherein said interference pattern generating means comprises beamsplitting cube means for generating two separate beams from said reflected light beam and for recombining said two beams to create an interference pattern, and further comprises two roof prisms abutting adjacent faces of said beamsplitting cube means, oriented with hypotenuse faces each receiving one of said two beams, for laterally shearing said two beams and for tilting said two beams with respect to one another such that after exiting said interference pattern generating means the projections of said two beams in a plane orthogonal to the direction of shear are not parallel; and wherein the difference in path length between said two beams is less than the coherence length of said coherent light beam.

2. The optical data storage device of claim 1 wherein the roof line of one of said roof prisms is shifted laterally from the center of the received one of said two beams, and wherein one of said roof prisms is tilted about an axis parallel to the direction of said lateral shear.

3. The optical data storage device of claim 2 wherein one of said adjacent faces of said beamsplitting cube means is not orthogonal to the other of said adjacent faces of said beamsplitting cube means, thereby providing said tilt.

4. The optical data storage device of claim 3 wherein said one of said adjacent faces of said beamsplitting cube means is ground at an angle to provide the non-orthogonal orientation with respect to said other adjacent face of said beamsplitting cube means.

5. The optical data storage device of claim 1 wherein said rotation sensing means comprises a quadrant detector having four photodetectors in a rectangular array and detection circuit means electronically coupled to said photodetectors for supplying electronic signals indicative of focus, too-close nonfocus and too-far nonfocus conditions in accordance with the relative light intensities received on said photodetectors, said intensities representative of the rotational orientation of said interference pattern.

6. The optical data storage device of claim 5 wherein said addressing means for moving said light beam to optically access said data storage locations includes means for adjusting the focus of said impinging light beam, said addressing means operatively coupled to said focus error detection means.

7. The optical data storage device of claim 1 wherein said rotation sensing means abuts said interference pattern generating means.

* * * * *